Patented Aug. 10, 1948

2,446,957

UNITED STATES PATENT OFFICE 2,446,957

PROCESS FOR PRODUCING NICOTINAMIDE

Hans R. Rosenberg, Wilmington, Del., assignor to E. I. du Pont de Nemours & Company, Wilmington, Del., a corporation of Delaware No Drawing. Application January 14, 1943, Serial No. 472,383

3 Claims. (Cl. 260—295.5)

This invention pertains to a new and improved process for the production of nitrogen-containing compounds and more particularly refers to a process for producing nicotinamides.

It is well known that nicotinamide is the pellagra-preventive factor. This product has heretofore been produced by the conversion of nicotinic acid to nicotinamide with ammonia and also by the conversion of an ester of nicotinic acid into nicotinamide by means of aqueous or alcoholic ammonia. These processes are, however, subject to the disadvantages that they are inefficient, expensive and frequently result in the production of certain deleterious by-products. The foregoing processes are described on page 225 of applicant's book entitled "Chemistry and Physiology of the Vitamins," published in 1942 by the Interscience Publishers, Inc., of New York.

It is an object of this invention to overcome the foregoing disadvantages of the prior art and other disadvantages which directly or indirectly result therefrom. A further object is to produce nicotinamide and other therapeutically valuable derivatives thereof by new and improved processes. A still further object is to produce the foregoing products by a cheap, simple and efficient process. A still further object is to produce these products by a process which does not at the same time produce deleterious or toxic by-products. Additional objects will become apparent from a consideration of the following description and claims.

These objects are attained in accordance with the herein described invention wherein 3-cyanopyridine is converted to nicotinamides by heating it in the presence of water. In a more restricted sense this invention is directed to the treatment at elevated temperatures of 3-cyano-pyridine with water and a nitrogen-containing compound such as ammonia or an amine. In a still more restricted sense this invention is concerned with a process wherein 3-cyano-pyridine is heated in the presence of water and an organic amine. In one of its preferred embodiments this invention relates to the reaction of 3-cyano-pyridine and water and an aliphatic primary or secondary amine which is a solvent for the 3-cyano-pyridine.

The invention may be more readily understood by a consideration of the following specification and claims. In the following illustrative examples the quantities are stated in parts by weight.

Example 1

3-cyano-pyridine was dissolved in an equimolecular amount of water and heated to 250° C. over a period of eight hours. After cooling, the residue was dissolved in hot dioxane and filtered. Upon cooling, nicotinamide crystallized out. It had a melting point of about 129° C.

Example 2

17 parts of 3-cyano-pyridine and 10 parts of 28% ammonia were heated in a sealed tube to 200° C. for twelve hours. After cooling, the solidified material was filtered off. The filter cake was dissolved in hot dioxane and filtered from nicotinic acid formed as a by-product in the reaction. From the dioxane, nicotinamide crystallized upon cooling.

Example 3

10 parts of 3-cyano-pyridine were dissolved in 10 parts of water and thirty parts of normal amyl amine added. The mixture was heated in an autoclave at 150° C. for twelve hours. After cooling, the mixture was fractionally distilled at 15–20 mm. pressure. Water and normal amyl amine distilled over at about 30–50° C., while at 80–85° C., 3-cyano-pyridine distilled over. The residue was crystallized from dioxane.

As a by-product of this reaction N-amyl-nicotinamide was obtained. It distilled under the vacuum of a water pump at about 90–95° C.

Example 4

10 parts of 3-cyano-pyridine were dissolved in twenty parts of morpholine and ten parts of water added. The mixture was heated to reflux and kept at that temperature overnight. Upon fractional distillation, nicotinic acid amide, melting point 128–129° C., was obtained.

It is to be understood that the foregoing examples are representative merely of a few of the many embodiments of this invention. They may be varied widely with respect to the individual constituents, the amounts thereof and the conditions of reaction without departing from the scope hereof.

3-cyano-pyridine is the preferred starting compound. This compound may be made by several well known methods of the prior art. The particular method of making it is relatively immaterial, but the compound should advisably be free from constituents which interfere with the described reactions or the uses of the resulting products.

When 3-cyano-pyridine is reacted at elevated temperatures with water in the absence of a nitrogen-containing catalyst or compound it is generally advisable to employ an approximately equimolecular amount of water. As shown in Example 1, the reaction may be carried out at temperatures in the neighborhood of 250° C. for a period of about eight hours. It should be understood, however, that the foregoing temperature and time may be varied widely without departing from the scope hereof. For example, a lower temperature might be employed, in which case the time of the reaction would be correspondingly increased. On the other hand, a higher temperature might be employed with a corresponding decrease in the time of the reaction. This reaction proceeds readily and results in the production of almost theoretical yields of the desired nicotinamide.

In place of water alone the reaction may preferably be carried out with water and a nitrogen-containing compound such as ammonia or an amine. This latter reaction does not require as careful control as that just described, since the amount of water may be varied widely and the temperature and time of the reaction may be reduced without detracting from the desirable results. The reaction of 3-cyano-pyridine, water and an organic amine, as exemplified by Examples 3 and 4, is representative of this desirable expedient. The product is readily obtained in pure form and in satisfactory yields.

Where the foregoing reaction is carried out in the presence of an amine, it frequently results in the production of a certain amount of by-products which are N-substituted nicotinamides. These by-products have a variety of important uses, such as, for example, cardiac stimulants and compounds for use in the treatment of shock and collapse.

Various amines or mixtures thereof may be used for this purpose. These amines may be primary, secondary and/or tertiary, and they may be aliphatic, aromatic and/or heterocyclic. A few of the many amines embraced within this category are methyl-, dimethyl-, ethyl-, diethyl-, methyl-ethyl-, propyl-, dipropyl-, methyl-propyl-, ethyl-propyl-, isopropyl-, di-isopropyl-, butyl-, amyl-, diamyl-, methyl-amyl-, amines; and aniline, monomethyl aniline, diethyl aniline, dimethyl-cyclohexyl-amine, piperidine, piperazine, etc.

As a general rule, it is advisable to employ either primary or secondary aliphatic amines having less than eight carbon atoms in the molecule. Excellent results have been obtained by selecting those amines with high dissociation constants. For optimum results those amines which dissolve the 3-cyano-pyridine, or other nitrile to be hydrated, should generally be selected.

By means of the present invention a new and improved process for the production of nicotinamide and related compounds may be utilized. This process is not subject to the disadvantages of prior art processes, since it is simple, cheap and expeditious. It results in the production of extremely high yields of the desired products and eliminates many of the steps heretofore considered to be essential. Instead of producing these compounds under acidic or neutral conditions it now permits them to be manufactured under alkaline conditions. Furthermore, it avoids the production of deleterious by-products. This process is likewise susceptible to considerable variation with respect to the reactants, the proportions thereof and the conditions of reaction.

As many widely different embodiments of this invention may be made without departing from the spirit and scope thereof, it is to be understood that the invention is not limited to the specific embodiments thereof except as defined in the appended claims.

I claim:

1. A process for producing nicotinamide which comprises heating 3-cyano-pyridine in the presence of water and an organic amine.

2. A process for producing nicotinamides which comprises heating 3-cyano-pyridine in the presence of water and an aliphatic amine which is a solvent for the 3-cyano-pyridine.

3. A process for the preparation of nicotinamide which comprises heating 3 cyano pyridine in the presence of water and an aliphatic amine.

HANS R. ROSENBERG.

REFERENCES CITED

The following references are of record in the file of this patent:

FOREIGN PATENTS

| Number | Country | Date |
| --- | --- | --- |
| 457,621 | Great Britain | 1935 |
| 488,642 | Great Britain | 1938 |

OTHER REFERENCES

Lucas, Organic Chemistry, page 295, American Book Co., 1933.

Liebigs, Annalen de Chemie 487, p. 131.